(12) United States Patent
Iijima et al.

(10) Patent No.: US 8,516,283 B2
(45) Date of Patent: Aug. 20, 2013

(54) NETWORK MANAGEMENT APPARATUS

(75) Inventors: Tomoyuki Iijima, Tokyo (JP); Hiroyasu Kimura, Chigasaki (JP); Takeshi Aimoto, Kawasaki (JP)

(73) Assignee: ALAXALA Networks Corporation, Kawasaki (JP)

( * ) Notice: Subject to any disclaimer, the term of this patent is extended or adjusted under 35 U.S.C. 154(b) by 309 days.

(21) Appl. No.: 12/903,876

(22) Filed: Oct. 13, 2010

(65) Prior Publication Data
US 2011/0087906 A1 Apr. 14, 2011

(30) Foreign Application Priority Data
Oct. 14, 2009 (JP) ................................. 2009-236802

(51) Int. Cl.
*G06F 1/26* (2006.01)
(52) U.S. Cl.
USPC ............................ 713/320; 709/241; 370/289
(58) Field of Classification Search
USPC .................. 713/320–340; 709/241; 370/389
See application file for complete search history.

(56) References Cited

U.S. PATENT DOCUMENTS
2007/0053360 A1  3/2007 Hino et al.

FOREIGN PATENT DOCUMENTS
| JP | 2002-142038 | * | 5/2002 |
| JP | 2007-097126 |   | 4/2007 |
| JP | 2007-097126 | * | 12/2007 |

* cited by examiner

*Primary Examiner* — Tim Vo
*Assistant Examiner* — Kim Huynh
(74) *Attorney, Agent, or Firm* — Foley & Lardner LLP (57) ABSTRACT

A network management/apparatus connected to a plurality of packet relay apparatuses constituting a group through a network includes an energy saving level calculation unit for calculating an energy saving level of each of the packet relay apparatuses on the basis of a CPU usage ratio of the packet relay apparatus managed or a difference between the present energy saving level and the energy saving level of minimum guarantee of the packet relay apparatus, and an energy saving function setting unit for setting an energy saving function of the packet relay apparatuses on the basis of the energy saving level calculated by the energy saving level calculation unit.

10 Claims, 11 Drawing Sheets

ENERGY SAVING CONTROL SCHEDULE OF MODEL B — 102
ENERGY SAVING LEVEL MANAGEMENT TABLE OF MODEL A — 101

| ENERGY SAVING LEVEL | CPU FREQUENCY | NUMBER OF OPERATING MODULES | POWER OF STANDBY SYSTEM | SLEEP FUNCTION | |
|---|---|---|---|---|---|
| 100 (MAXIMUM) | HIGH | 2 | ON | OFF | 111 |
| 75 (HIGH) | LOW | 2 | ON | OFF | 112 |
| 50 (MIDDLE) | LOW | 2 | OFF | OFF | 113 |
| 25 (LOW) | LOW | 1 | OFF | OFF | 114 |
| 0 (MINIMUM) | — | — | — | ON | 115 |

Columns: 103, 104, 105, 106, 107

FIG.4

| APPARATUS NAME | GROUP ID | ENERGY SAVING LEVEL | | | |
| --- | --- | --- | --- | --- | --- |
| | | NORMAL | MINIMUM GUARANTEE | PRESENT | |
| PACKET RELAY APPARATUS 13 | DEPARTMENT A | 100 | 50 | 100 | 211 |
| PACKET RELAY APPARATUS 14 | DEPARTMENT A | 50 | 30 | 40 | 212 |
| PACKET RELAY APPARATUS 15 | DEPARTMENT A | 50 | 30 | 30 | 213 |
| PACKET RELAY APPARATUS 16 | DEPARTMENT B | 100 | 50 | 100 | 214 |
| PACKET RELAY APPARATUS 17 | DEPARTMENT B | 50 | 30 | 50 | 215 |
| PACKET RELAY APPARATUS 18 | DEPARTMENT B | 50 | 30 | 50 | 216 |

NETWORK MANAGEMENT APPARATUS

INCORPORATION BY REFERENCE

The present application claims priority from Japanese application JP2009-236802 filed on Oct. 14, 2009, the content of which is hereby incorporated by reference into this application.

BACKGROUND OF THE INVENTION

This invention relates to a network management apparatus for remote controlling consumed electric energy and an energy saving function of a plurality of packet relay apparatuses and a plurality of servers, a system, an apparatus management method, an integrated circuit and a program.

Attempts have been increasingly made worldwide to save energy. Packet relay apparatuses operable with reduced consumed electric energy have been required, too. Various proposals have therefore been made, and have practically been put into application, to suppress energy consumption of the packet relay apparatuses.

For example, the following energy saving function is provided for the packet relay apparatuses. (1) When traffic requiring a high speed operation of a CPU (Central Processing Unit) of a switching module does not exist, consumed electric energy can be reduced by lowering the frequency of the CPU. (2) When a plurality of modules are prepared inside a packet relay apparatus and a part of them is operated for an operation system with the other for a standby system, the supply of the electric power to the standby system modules is suspended in the time zone in which the volume of important traffics is not much great. (3) The packet relay apparatuses are operated only in business hours and are allowed to sleep unconditionally in outside hours. (4) When the packet relay apparatus supplies the electric power to PoE standard telephones through a PoE (Power over Ethernet (Registered trademark)) line and wireless AP (Access Points), the supply of the power is delicately controlled. (5) Only when the Ethernet® line is connected to the plug socket of the Ethernet® line provided by the packet relay apparatus, the electric power is supplied to the plug socket and when the Ethernet® line is not connected, the power is not supplied to the plug socket. (6) When cooling operates sufficiently at the place of installation of the packet relay apparatus, the operation of a cooling fan is stopped. A large energy saving effect can be acquired lastly by delicately controlling the energy saving operations of (1), (2), (3) and (4).

When a plurality of packet relay apparatuses is installed at the same place, the energy saving function of these apparatuses is generally managed in most cases on the basis of a similar operation policy. In other words, similar setting is applied mostly to the energy saving function of the plurality of packet relay apparatuses. Therefore, the most appropriate operation method may be the one in which a network management apparatus is prepared instead of setting individually each packet relay apparatus and the plurality of relay apparatuses are collectively managed by the network management apparatus. It is easy by using the network management apparatus to operate a tool that can be set by GUI (Graphical User Interface) and to provide a schedule function. Thus, the operation load of the packet relay apparatuses can be drastically reduced.

The explanation given above holds true not only of the packet relay apparatus but also of a plurality of servers operating inside a data center. A server management system for managing a plurality of servers and an energy saving management system for managing a plurality of packet relay systems and servers have therefore become indispensable.

The technologies mentioned above are described in US2007/053360A1, Hino et al. (corresponding to JP-A-2007-97126) and JP-A-2002-142038.

SUMMARY OF THE INVENTION

A large number of technologies for suppressing consumed electric energy of packet relay apparatuses exist. It is expected, on one hand, that the consumed electric energy can be delicately controlled in accordance with the time zone and the traffic volume. When the energy saving function is diversified, therefore, delicate control of each function becomes troublesome. To delicately control the supply to the packet relay apparatus, it is desired that the energy saving function can be changed flexibly.

Setting of the energy saving function by utilizing the schedule function of the network management apparatus is based on the assumption that the manager of the network is absent at the schedule time. The network management apparatus automatically operates at the appointed time and controls the energy saving function of the packet relay apparatus in accordance with the scheduled setting. In this case, the following packet relay apparatuses may arise undesirably. First, a packet relay apparatus may be set indiscriminately to the low consumed power in accordance with the schedule although a large volume of traffics is processed with the result that the transfer performance drops and packet loss occurs. Second, because the supply quantity is indiscriminately raised in accordance with the schedule although the traffic hardly exists, the packet relay apparatuses may consume the power in vain. Desirably, the network management apparatus can adjust the electric energy among the packet relay apparatuses to prevent the waste of the power supply by utilizing its feature that it can manage a plurality of packet relay apparatuses. More concretely, the network management apparatus can desirably mediate the energy used wastefully by a certain packet relay apparatus to another packet relay apparatus that really needs the energy.

To accomplish the object described above, a network management apparatus according to the invention includes an energy saving level management table for holding the combination of operation modes of a plurality of energy saving functions provided to packet relay apparatuses managed and energy saving levels in association with one another, an energy saving level calculation unit for calculating an energy saving level of the packet relay apparatuses constituting a group on the basis of a CPU usage ratio of the packet relay apparatus or the difference between the present energy saving level of the packet relay apparatus and the energy saving level of minimum guarantee, and an energy saving function setting unit for setting the energy saving function of the packet relay apparatuses on the basis of the energy saving level calculated by the energy saving level calculation unit.

It has been necessary in the past to finely set a plurality of energy saving functions to each packet relay apparatus when controlling electric energy of the packet relay apparatuses. However, energy saving of the packet relay apparatuses becomes possible through a single parameter by defining "energy saving levels". Because a network operator can now control the energy saving functions of the packet relay apparatuses through the single parameter of the "energy saving levels", the operator can easily operate the energy saving functions. When a program for managing the energy saving functions of a plurality of packet relay apparatuses on the basis of GUI, program can be developed more easily since an algorithm can be assembled by taking only the single parameter into consideration.

It is thus possible to prevent the occurrence of those packet relay apparatuses to which only limited energy is allocated although they handle a large packet processing volume and those packet relay apparatuses to which the energy is allocated in excess although they have only a small packet processing volume, to optimize of the allocation of the electric energy to the group as a whole and to autonomously distribute the energy to the packet relay apparatus requiring the energy from those which do not.

Other objects, features and advantages of the invention will become apparent from the following description of the embodiments of the invention taken in conjunction with the accompanying drawings.

DESCRIPTION OF THE EMBODIMENTS

To control flexibly and delicately the supply to packet relay apparatuses, this embodiment defines "energy saving level" for collectively controlling a plurality of energy saving functions provided by these packet relay apparatuses. The embodiment does not control the plurality of energy saving functions on the respective technical level but on the abstract level referred to as the "energy saving level". A network management apparatus holds an "energy saving level management table" and sets an operation mode of the energy saving function to each of the "energy saving levels".

To materialize energy adjustment among the packet relay apparatuses by the network management apparatus, the network management apparatus keeps an "apparatus management table" and a "schedule management table". An ID of the group to which each packet relay apparatus belongs, the "energy saving level" of a normal time zone and the "energy saving level" of minimum guarantee are set to the "apparatus management table". The supply amount and consumed electric energy corresponding to the time zone or a relative value corresponding to the peak of the consumed energy are put in advance to the "schedule management table" for each group. An example of setting is as follows: "Packet relay apparatuses are operated without limiting energy in the daytime of weekdays and within 50% of the peak and within 30% of consumed energy in the night of the weekdays and in holidays, respectively".

The network management apparatus periodically acquires consumed energy of each packet relay apparatus and a CPU usage ratio of a switching module by using SNMP (Simple Network Management Protocol) and NETCONF (NETwork CONFiguration). By using these means, the network management apparatus recognizes the consumed energy of each packet relay apparatus. The network management apparatus sums the consumed energy for each group and optimizes power allocation within the group when the total consumed energy exceeds allowable consumed power to the whole groups in the night and holidays. More concretely, the energy saving level is lowered from the packet relay apparatus having the smallest CPU usage ratio of the switching module among the plurality of packet relay apparatuses having the same group ID (or from the packet relay apparatus having the greatest difference between the present "energy saving level" and the "energy saving level# of the minimum guarantee"). This procedure is repeated until the consumed energy of the whole group becomes smaller than the allowable consumed energy to the whole group.

When the network management apparatus recognizes the packet relay apparatus to which a large load exceeding a 90% CPU usage ratio of the switching module is applied, on the other hand, the "energy saving level" of this relay apparatus is immediately raised. When the consumed energy of the whole group increases and exceeds the allowable energy permitted to the whole group in consequence, the "energy saving level" of the packet relay apparatus having the smallest CPU usage ratio of the switching module among the plurality of packet relay apparatuses having the same group ID (or from the packet relay apparatus having the greatest difference between the present "energy saving level" and the "energy saving level" of the minimum guarantee) is lowered on the basis of the algorithm described already. Eventually, energy saving can be accomplished.

Embodiment 1

The invention will be explained hereinafter concretely about some preferred embodiments thereof.

An embodiment of the invention in which the network management apparatus controls the energy saving function of each of the packet relay apparatuses will be explained with reference to FIGS. 1 to 9.

Figure 1:
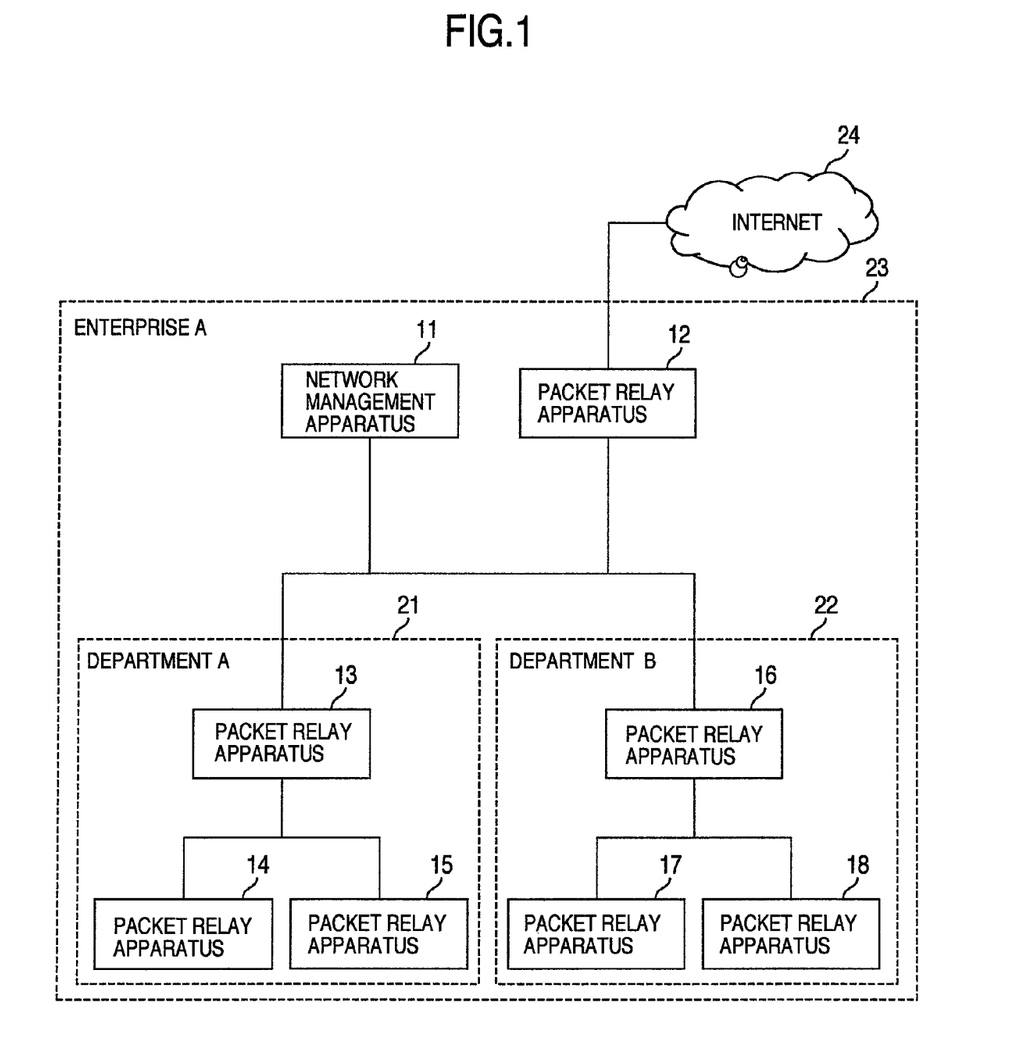
FIG. 1 is a block diagram showing a network construction.

FIG. 1 shows the network construction in this embodiment. An enterprise A has a department A and a department B and a plurality of packet relay apparatuses is connected to each department. Each department is connected to an Internet 24 through the packet relay apparatus 12 and data are exchanged between ht packet relay apparatus and the Internet 24. The network management apparatus 11 is installed in the enterprise A and can gain access to the packet relay apparatuses installed in the department A and the department B by using an IP (Internet Protocol).

Figure 2:
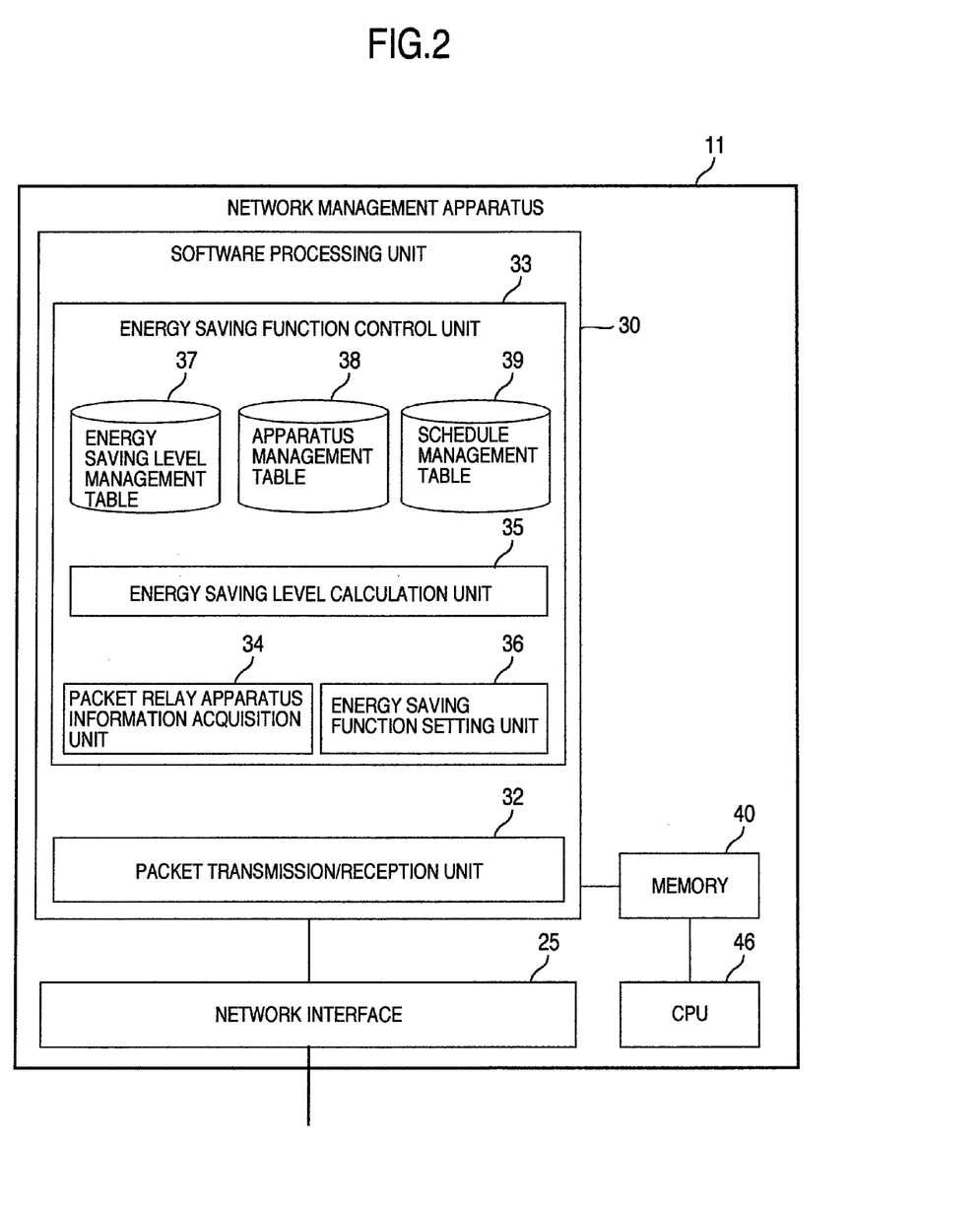
FIG. 2 is block diagram showing an internal construction of a network management apparatus.

FIG. 2 is a block diagram showing an internal construction of the network management apparatus 11. The network management apparatus uses a general-purpose personal computer and has a CPU 46, a memory 40 and a network interface 25.

A software processing unit 30 operates on the memory 40 and a packet transmission/reception unit 32 and an energy saving function control unit 33 operate inside the software processing unit 30. A packet relay apparatus information acquisition unit 34, an energy saving level calculation unit 35 and an energy saving function setting unit 36 exist inside the energy saving function control unit 33. An energy saving level management table 37, an apparatus management table 38 and a schedule management table 39 are provided as units for holding the information that is to be set by a manager to the energy saving function control unit 33.

Figure 3:
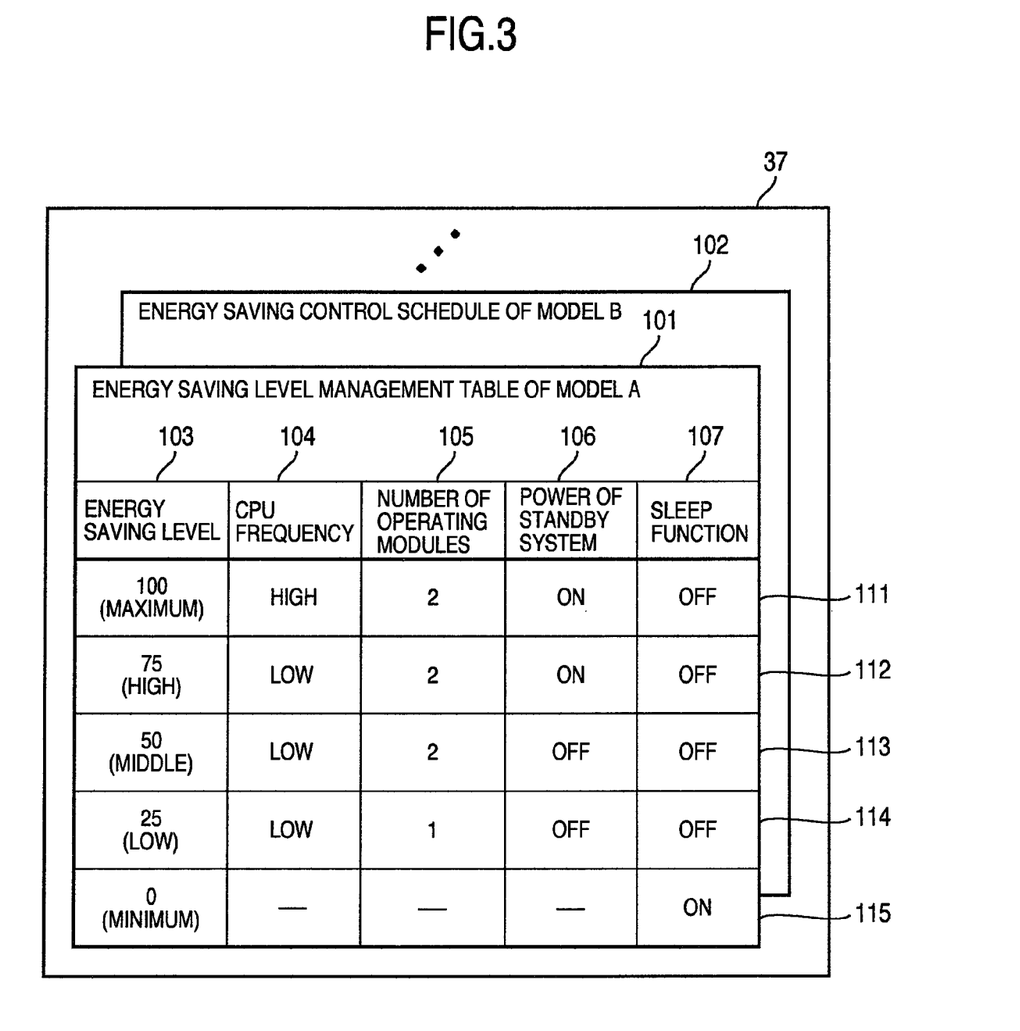
FIG. 3 is a table showing a construction of an energy saving level management table held by the network management apparatus.

FIG. 3 shows a construction of the energy saving level management table 37 held by the network management apparatus 11. The level of energy saving (hereinafter called "energy saving level 103") is divided into a plurality of levels in the energy saving level management table 37 and a plurality of operation modes of the energy saving function provided by each packet relay apparatus (frequency 104 of the CPU of the switching module, the number of operating modules 105, electric power 106 of a standby system and sleep function 107 in the case of FIG. 3) is set in advance to each level.

In FIG. 3, the operation manager makes setting in advance in such a fashion that the maximum value of the energy saving level is "100", the CPU is allowed to operate at a high speed for the packet relay apparatus to which the energy saving level of "100" is applied, a plurality of modules is prepared for a working system and for a standby system, power is always supplied to the standby system module and the sleep function does not operate (111). Similarly, the operation manager makes setting in such a fashion that the frequency of the CPU is lowered, the CPU is allowed to operate at a low speed, the standby system is not prepared without the supply of power and the sleep function is not operated (114).

The network management apparatus 11 manages the energy saving level management table for each apparatus model of the packet relay apparatus. In FIG. 3, the network management apparatus 11 manages an energy saving level management table 101 and an energy saving management table 102 as the energy saving management tables of the apparatus model A and the apparatus model B of the packet relay apparatus, respectively.

Management/control of the plurality of packet relay apparatuses becomes easier because the combination of the operation modes of the plurality of energy saving functions provided by the packet relay apparatuses is managed by a single parameter of the energy saving level as described above.

Figure 4:
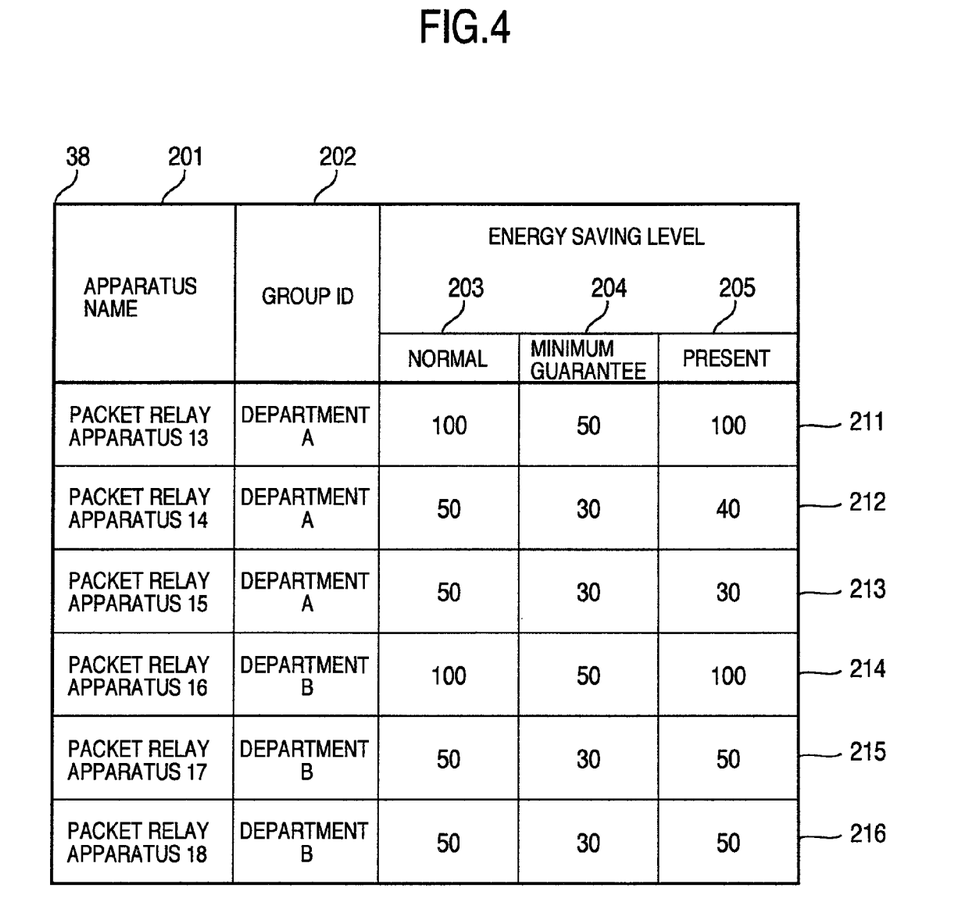
FIG. 4 is a table showing a construction of an apparatus management table held by the network management apparatus.

FIG. 4 shows the construction of the apparatus management table 38 held by the network management apparatus 11. In the apparatus management table 38, the operation manager sets and manages beforehand an ID 202 of the group to which the packet relay apparatus belongs, an energy saving level 203 in the normal operation and an energy saving level 204 of the minimum guarantee 204. The network management apparatus 11 manages by itself the energy saving level applied to the packet relay apparatus as the present energy saving level 205.

In the case shown in FIG. 4, the packet relay apparatus 13 belongs to the department A and is so set as to operate on the energy saving level 100 in the normal time zone. Therefore, the packet relay apparatus 13 operates in such a fashion that it allows the CPU to operate at a high speed in the normal time zone, prepares a plurality of modules in the working system and in the standby system, power is always supplied to the standby modules and the operation is made without operating the sleep function.

The energy saving level 204 of the minimum guarantee of the packet relay apparatus is further set to the apparatus management table 38. This is an item for preventing the energy saving level from falling below the energy saving level 204 of the minimum guarantee even when the network management apparatus 1 so operates as to lower the consumed energy of the packet relay apparatus. Because the minimum guarantee energy saving level of the packet relay apparatus 13 is set to 50, the standby system module of the packet relay apparatus 13 is not released from the standby state even when the network management apparatus 11 attempts to lower the consumed energy (or the packet relay apparatus does not enter the energy saving level 25 or 0). The network management apparatus 11 can avoid giving the instruction of lowering the energy saving level to the packet relay apparatus operating on the energy saving level of the minimum guarantee, too. This parameter helps prevent the consumed energy of all the packet relay apparatuses from being lowered indiscriminately. Also, preferential power supply to the packet relay apparatus or apparatuses installed at important points can be insured.

Figure 5:
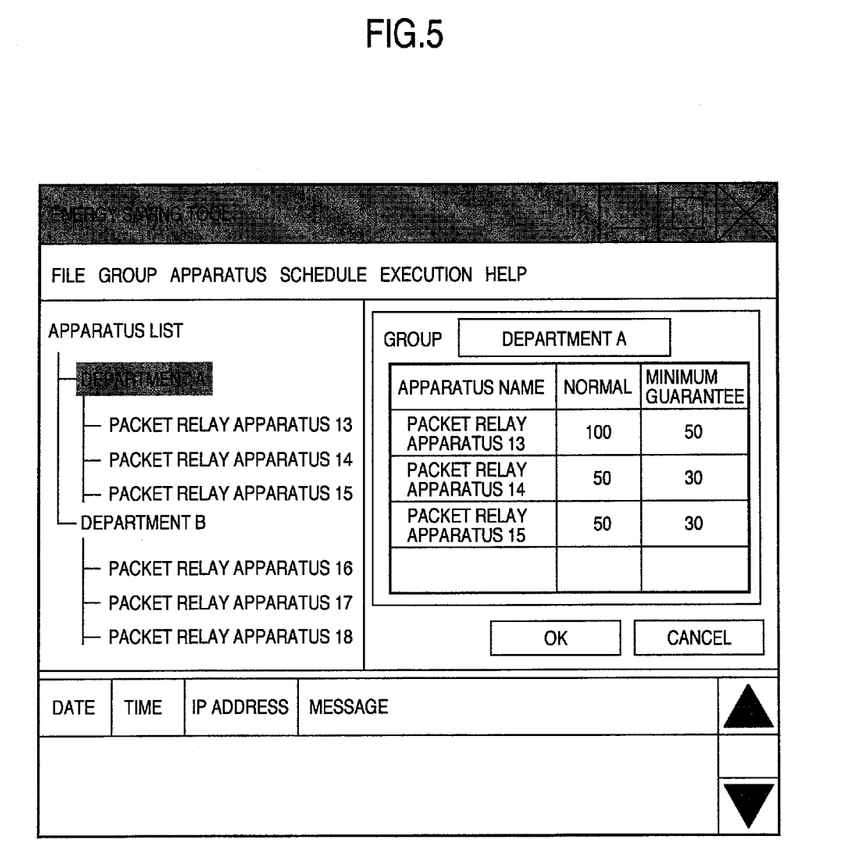
FIG. 5 is an explanatory view showing GUI for setting an energy saving level of each packet relay apparatus in the network management apparatus.

FIG. 5 shows a window construction of GUI when the network management apparatus 11 sets the energy saving level of the normal time zone and the energy saving level of the minimum guarantee to each packet relay apparatus. The operation manager can easily set and change the energy saving level of the normal time zone and the energy saving level of the minimum guarantee to each packet relay apparatus by using the screen of GUI shown in FIG. 5.

The apparatus management table 28 further manages the energy saving level set dynamically by the network management apparatus 11 to each packet relay apparatus as the present energy saving level 205.

In addition to the energy saving management table 37 and the apparatus management table 38, the network management apparatus 11 manages also the schedule management table 39.

Figure 6:
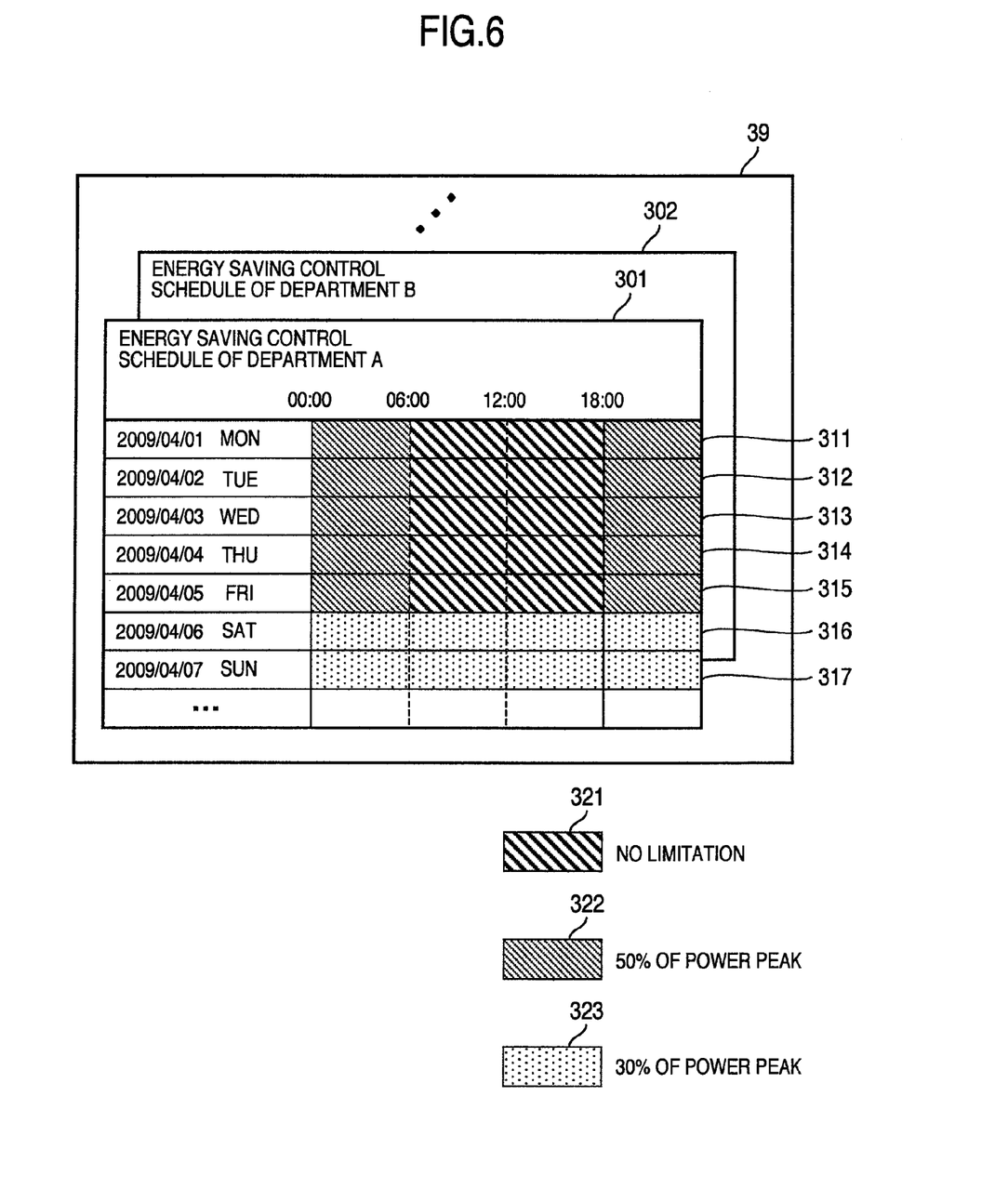
FIG. 6 is an explanatory view showing a construction of a schedule management table held by the network management apparatus.

FIG. 6 shows a construction of the schedule management table 39 held by the network management apparatus 11. Allowable electric energy corresponding to each time zone is set beforehand to the schedule management table 39 for each group (department) managed by the network management apparatus 11. In the example shown in FIG. 6, the schedule management table 39 holds the schedule management table 301 and the schedule management table 302 as the allowable electric energy for the department A and the department B, respectively. In the department A, setting is made so that no limitation is put to the consumed energy in the time zone of the daytime of weekdays (6:00 to 18:00) from April 1 (Mon.) to April 5 (Fri.) and the operation is made at the consumed energy of 50% of the peak energy in the time zone of the night (18:00 to 06:00 of next day). Setting is made further so that the operation is made at the 30% consumed energy of the peak in the holidays of April 6 (Sat.) and April 7 (Sun).

Figure 7:
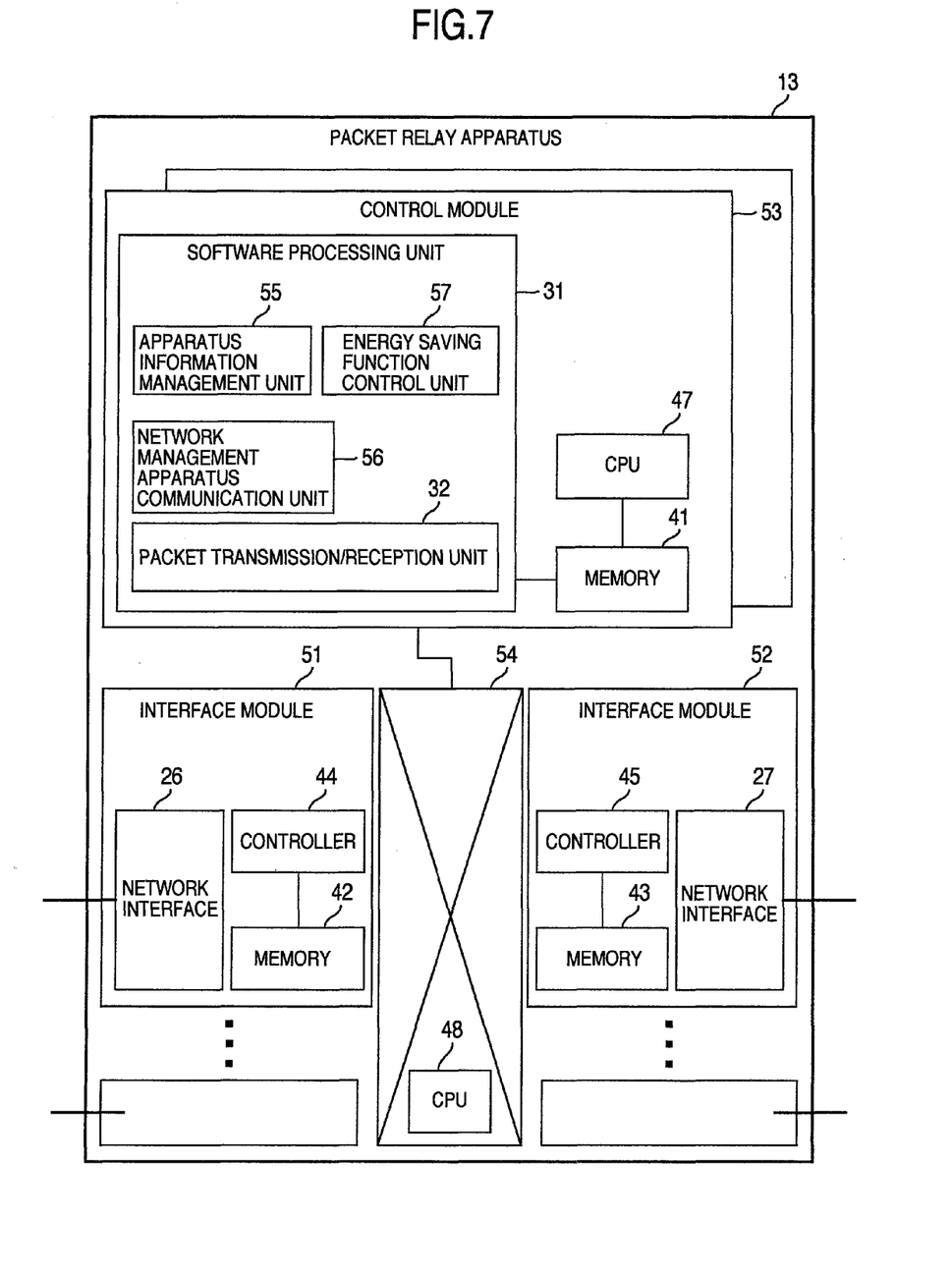
FIG. 7 is a block diagram showing an internal construction of a packet relay apparatus.

FIG. 7 is a block diagram showing an internal construction of the packet relay apparatus 13 as the management object of the network management apparatus 11. Though the internal construction of the packet relay apparatus 13 is explained hereby as a representative, other packet relay apparatuses 14 to 18 have a similar construction.

Speaking broadly, the packet relay apparatus 13 includes interface modules 51 and 42, a control module 53 and a switching module 54. The interface module includes a network interface 26, a controller 44 and a memory 42. The controller 44 recognizes the address of the packet received by the network interface 26 and the output interface module is decided. The packet decided by the output interface module is sent to the switching module 54 and is forwarded to a desired output interface module by the CPU 48 inside the switching module 54. The packet so sent to the output interface module is then sent to another packet relay apparatus from the network interface 27 inside the interface module.

The control module 53 includes a memory 41 and a CPU 47 and a software processing unit 31 is expanded on the memory 41. A packet transmission/reception unit 32, a network management apparatus communication unit 56 for controlling communication with the network management apparatus 11, an apparatus information management unit 55 and an energy saving function control unit 57 operate in the software processing unit 31. When a set request about the energy saving function is sent from the network management apparatus 11 to the packet relay apparatus 13, the message is sent to the energy saving function control unit 57 through the network management apparatus communication unit 56 and setting is then made. When a message requesting the information of the consumed energy and the CPU usage ratio of the switching module 54 is sent from the network management apparatus 11 to the packet relay apparatus 13, the information managed by the apparatus information management unit 55 is answered to the network management apparatus 11 through the network management apparatus communication unit 56.

Figure 8:
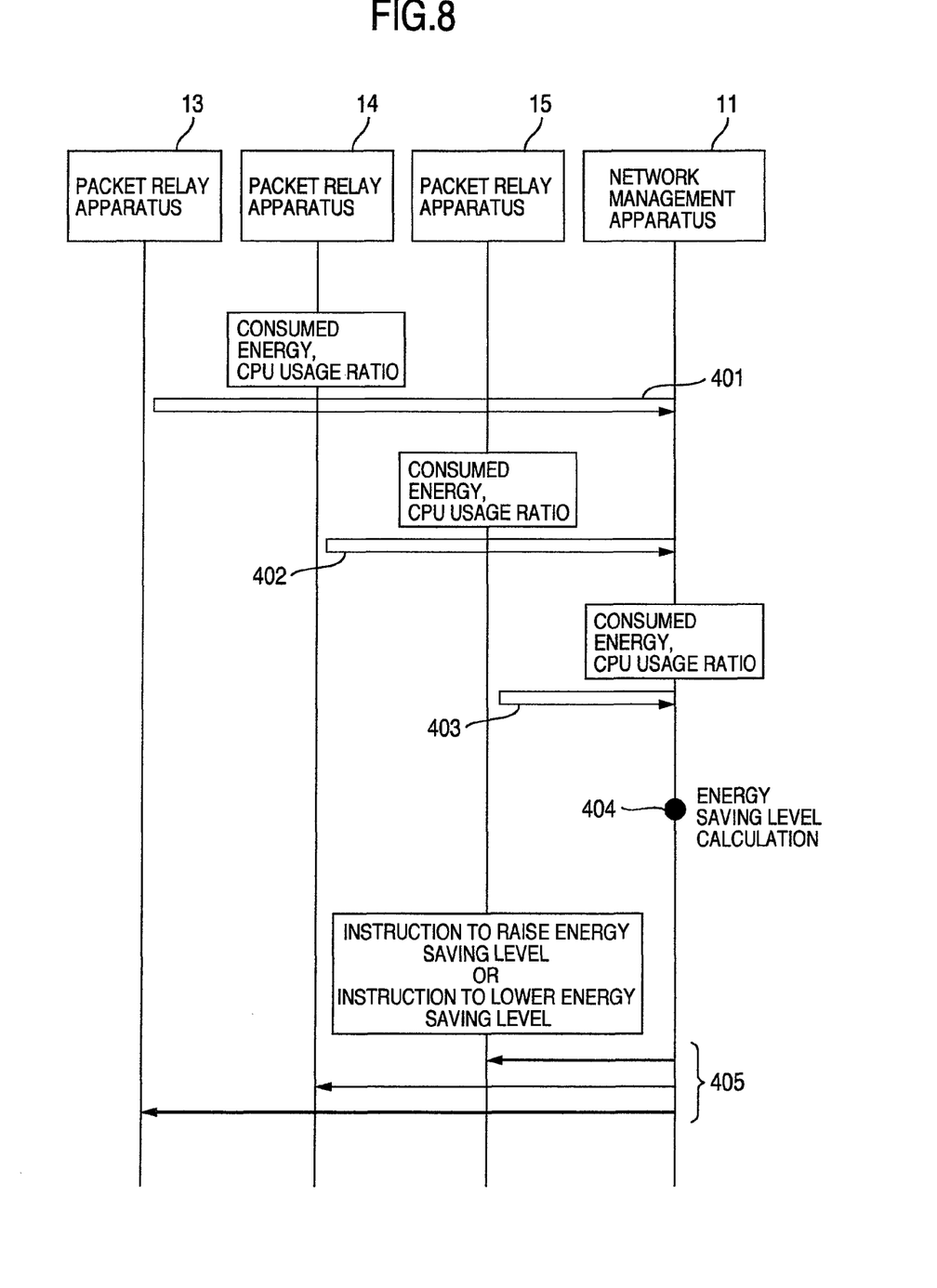
FIG. 8 is a sequence diagram showing the procedure of an energy saving function of the packet relay apparatus by the network management apparatus.

FIG. 8 is a sequence diagram showing a process for saving electric energy consumed by the whole groups by dynamically controlling the energy saving function of each packet relay apparatus by the network management apparatus 11.

The packet relay apparatus information acquisition unit 34 inside the network management apparatus 11 periodically gains access to each packet relay apparatus managed by the apparatus management table 38 such as once per ten minutes and acquires the consumed electric energy of each packet relay apparatus and the CPU usage ratio of the switching module 54. Alternatively, report is given periodically from each packet relay apparatus to the network management apparatus 11. The acquired information of the consumed energy and the CPU usage ratio in the switching module 54 may well be acquired by getting the information defined by MIB (Management Information Base) by using SNMP or by using NETCONF. When report is made by using the means of SNMP Trap or NETCONF Notification, report is made at the timing at which the consumed energy and the CPU usage ratio of the switching module 54 exceed their threshold values set in advance to the packet relay apparatus. In FIG. 8, the network management apparatus 11 gains access to the packet relay apparatuses 13, 14 and 15 belonging to the department A and acquires the consumed electric energy of each packet relay apparatus and the CPU usage ratio of the switching module 54 (401, 402, 403). These kinds of information are delivered to the packet relay apparatus information acquisition unit 34 through the line interface4 31 of the network management apparatus 11 and through the packet transmission/reception unit 32.

The energy saving level calculation unit 35 inside the energy saving function control unit 33 calculates an appropriate energy saving level of each of the packet relay apparatuses 13 to 15 by using the information the packet relay apparatus information acquisition unit 34 acquires in steps 401 to 403 and the information of the energy saving level management table 37, the apparatus management table 38 and the schedule management table 39 (404).

The energy saving function setting unit 36 inside the energy saving function control unit 33 gives instruction to raise or lower the energy saving level to each packet relay apparatus 13 to 15 on the basis of the calculation result of step 404 (405).

Figure 9:
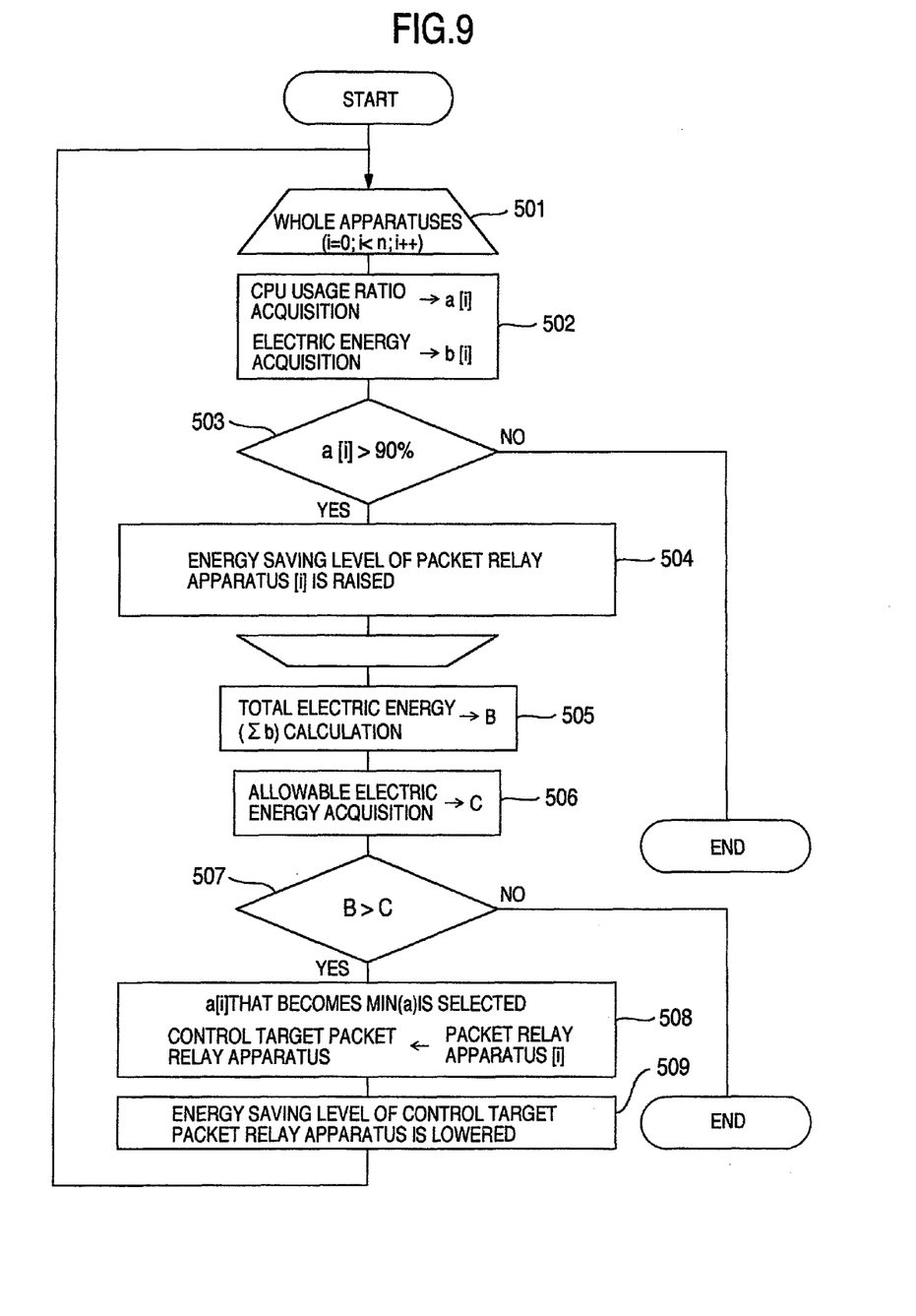
FIG. 9 is a flowchart for controlling an energy saving function of each packet relay apparatus by the network management apparatus.

FIG. 9 is a flowchart of a processing for controlling the energy saving function of each packet relay apparatus by the network management apparatus 11. The content of the processing of the network management apparatus in FIG. 8 will be explained in detail with reference to FIG. 9.

The energy saving level calculation unit 35 of the network management apparatus 11 stores the CPU usage ratio of each packet relay apparatus acquired by the packet relay apparatus information acquisition unit 34 in steps 401 to 403 in FIG. 8 into an array a[i] and the consumed electric energy into an array b[i] (501, 502). The energy saving level calculation unit 35 judges whether or not the packet relay apparatus the CPU usage ratio of which is higher than a predetermined threshold value (for example, [a[i]>90%]) exists (503). When the packet relay apparatus the CPU usage ratio of which exceeds the predetermined threshold value exists (YES in 503), the energy saving function setting unit 36 immediately gives an instruction to raise the energy saving level by one level to that packet relay apparatus (504). On the other hand, no instruction is given, in particular, to the packet relay apparatus the CPU usage ratio of which is lower than the predetermined value (NO in 503).

Next, the energy saving calculation unit 35 calculates the sum of the consumed electric energy for each group by using the consumed electric energy b[i] of each packet relay apparatus (505). It also looks up the schedule management table 39 and acquires the allowable electric energy of the department A at that point (506). Assuming that the time is 18:30, April 1 (Mon) at this time, the allowable electric energy is set to 50% of the energy peak as can be seen from FIG. 6. The energy saving level calculation unit 35 compares the sum B of the electric energy inside the department A and the allowable electric energy acquired from the schedule management table 39 (507).

When the sum B of the electric energy in the department A exceeds the allowable electric energy (YES in 507), the energy saving level calculation unit 35 selects the packet relay apparatus having the minimum a[i] value (508). For, the packet relay apparatus having the lowest CPU usage ratio of the switching module 54 is the packet relay apparatus having the largest margin. The CPU usage ratios of the packet relay apparatuses 13, 14 and 15 are stored in a[1], a[2] and a[3]. When these values are 30%, 50% and 50%, respectively, the packet relay apparatus having the value a[1], that is, the packet relay apparatus 13, is selected as the energy saving control target apparatus.

The network management apparatus 11 gives the instruction to lower by one level the energy saving level to the packet relay apparatus 13 selected in step 508 through the energy saving function setting unit 36 (509). More concretely, it can be understood from the apparatus management table 38 in FIG. 4 that the present energy saving level of the packet relay apparatus 13 is "100" and from the energy saving level management table 37 in FIG. 3 that the energy saving level lower by one level than the energy saving level "100" is "75". Lowering of the energy saving level of the packet relay apparatus 13 to "75" can be achieved by lowering the frequency of the CPU 48 of the switching module 54 from "HIGH" to "LOW" to accomplish the low speed operation. Consequently, the network management apparatus 11 generates the instruction for lowering the frequency of the CPU 48 from the energy saving function setting unit 36 to the packet relay apparatus 13. This procedure is repeated until the sum B of the electric energy inside the department A becomes smaller than the allowable electric energy C (until NO is reached in 507) and the energy saving level of each packet relay apparatus is set again.

When the energy saving level calculation unit 35 recognizes the packet relay apparatus operating at a high CPU usage ratio, it gives instantaneously the instruction to raise the energy saving level to that packet relay apparatus as explained in steps 503 and 504. For, this is the phenomenon in which the packet processing quantity drops and the packet relay apparatus falls under the high load state because a lower energy saving level is allocated. The sum B of the electric energy inside the group increases in consequence but when the sum exceeds the allowable electric energy C allocated to the group owing to the increment, the energy saving level of other packet relay apparatus is lowered in accordance with the afore-mentioned procedure (steps 505 to 509). In other words, the packet relay apparatus the energy saving level of which is raised in step 504 is prevented from being selected as the packet relay apparatus the energy saving level of which is to be lowered in step 508.

In step 508, the packet relay apparatus the present energy saving level 205 of which has already reached the energy saving level of the minimum guarantee may be prevented from being selected as the packet relay apparatus the energy level of which is to be lowered, by looking up the apparatus management table 38.

As described above, the electric energy can be optimized in the group unit in accordance with the schedule in the network apparatus. Even when the network manager is absent, energy can be supplied from the packet relay apparatus using unnecessarily the energy to the packet relay apparatus under the overload due to insufficiency of the energy because the network management apparatus monitors the energy of each packet relay apparatus and the CPU usage ratio of the switching module.

Embodiment 2

Figure 10:
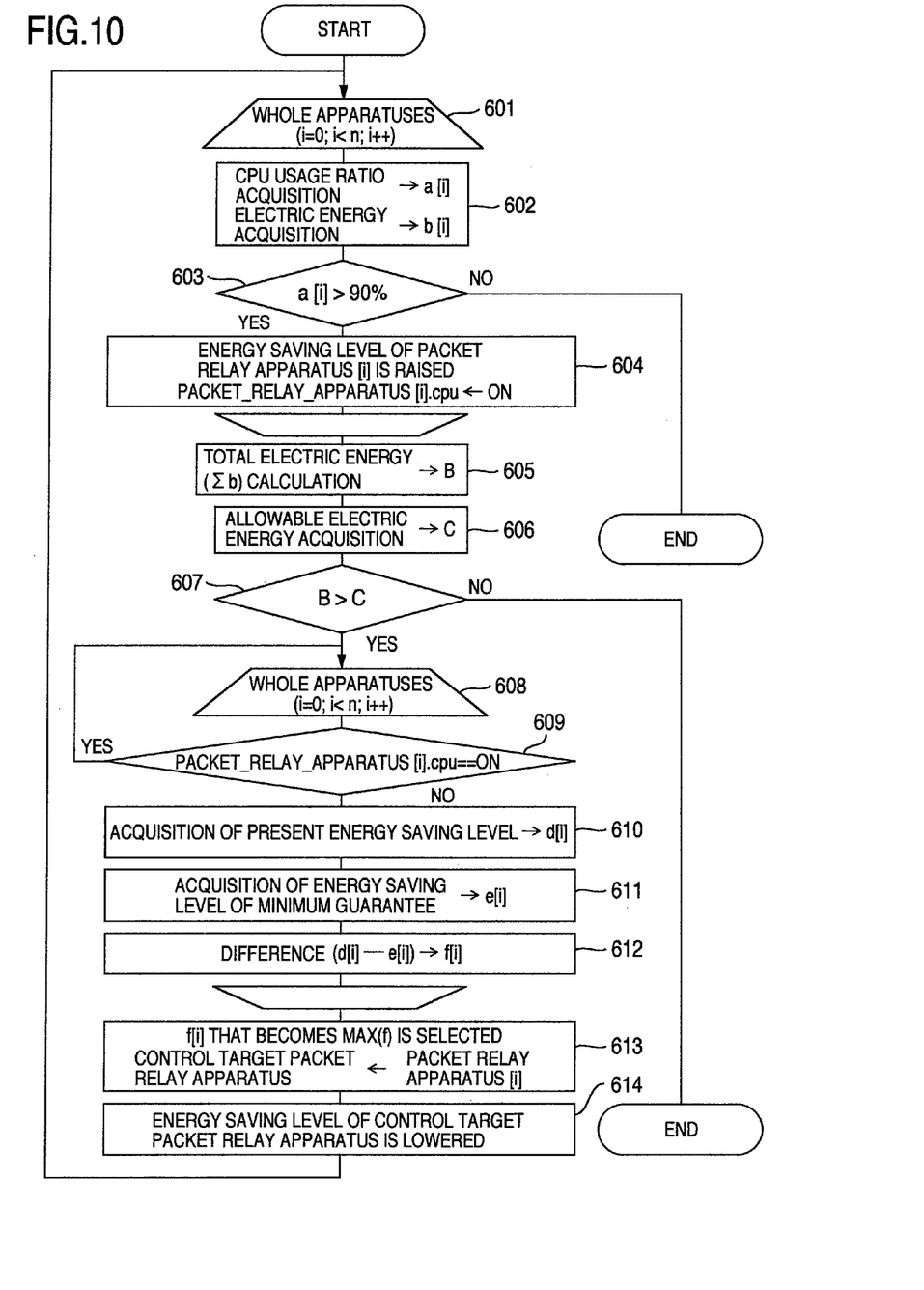
FIG. 10 is a flowchart of a second processing for controlling an energy saving function of each packet relay apparatus by the network management apparatus.

FIG. 10 is a flowchart for controlling an energy saving function of each packet relay apparatus by a second processing executed by the network management apparatus 11. The network management apparatus 11 may re-calculate the energy saving level of each packet relay apparatus in accordance with the flowchart of FIG. 10 but not FIG. 9. Incidentally, because FIG. 10 partially overlaps with FIG. 9, the explanation of the overlapping units will be omitted from time to time.

The flowchart shown in FIG. 10 is mainly different from that of FIG. 9 in the method for selecting the packet relay apparatus the energy saving level of which is to be lowered when the sum B of the electric energy inside the department A exceeds the allowable electric energy. More concretely, when the sum B of the electric energy inside the department A (606) exceeds (607) the allowable electric energy C (606), the energy saving level calculation unit 35 stores the difference between the present energy saving level d[i] (610) of each packet relay apparatus (610) and the energy saving level of the minimum guarantee e[i] (611) into the array f[i] (612). Both d[i] and e[i] can be acquired by looking up the apparatus management table 38 shown in FIG. 4.

Subsequently, the energy saving level calculation unit 35 selects the packet relay apparatus having the maximum value from the array f[i] storing the difference between the present energy saving level and the energy saving level of the minimum guarantee. The packet relay apparatus having the greatest difference between the present level and the energy saving level of the minimum guarantee is the one for which the greatest energy saving effect can be expected. Therefore, that apparatus is selected as the object apparatus for the energy saving level change (613). According to the apparatus management table 38 shown in FIG. 4, the f[i] values of the packet relay apparatuses 13, 14 and 15 are 50, 10 and 0, respectively.

Therefore, the packet relay apparatus 13 is selected as the object apparatus of the energy saving level change.

The network management apparatus 11 gives instruction to lower by one level the energy saving level of the packet relay system 13 through the energy saving function setting unit 36 (614). The present energy saving level of the packet relay system 13 is "100". It can be understood from the energy saving level management table 37 that the level lower by one level than the energy saving level "100" is "75". It can be understood also that the energy saving level of the packet relay apparatus 13 can be lowered to "75" by lowering the frequency of the switching module 54 from "HIGH" to "LOW" and changing the operation mode to the low speed operation. In consequence, the network management apparatus 11 gives the instruction to lower the frequency of the CPU 48 of the switching module 54 from the energy saving function setting unit 36 to the packet relay apparatus 13. This procedure is repeated until the sum B of the electric energy inside the department A falls below the allowable electric energy C and the energy saving level of each packet relay apparatus is set once gain.

Referring to FIG. 10, "packet_relay_[i].cpu" is set to ON in step 604 for the packet relay apparatus the energy saving level of which is raised and in step 609, the packet relay apparatus whose "packet_relay_apparatus [i].cpu" is ON is excluded from the processing object in the subsequent steps 610 to 612. Therefore, the difference f[i] between the present energy saving level and the energy saving level of the minimum guarantee is not calculated for the packet relay apparatus the energy saving level of which is raised, and the packet relay apparatus can be prevented from being selected as the packet relay apparatuses the energy saving level of which is to be lowered.

Embodiment 3

Figure 11:
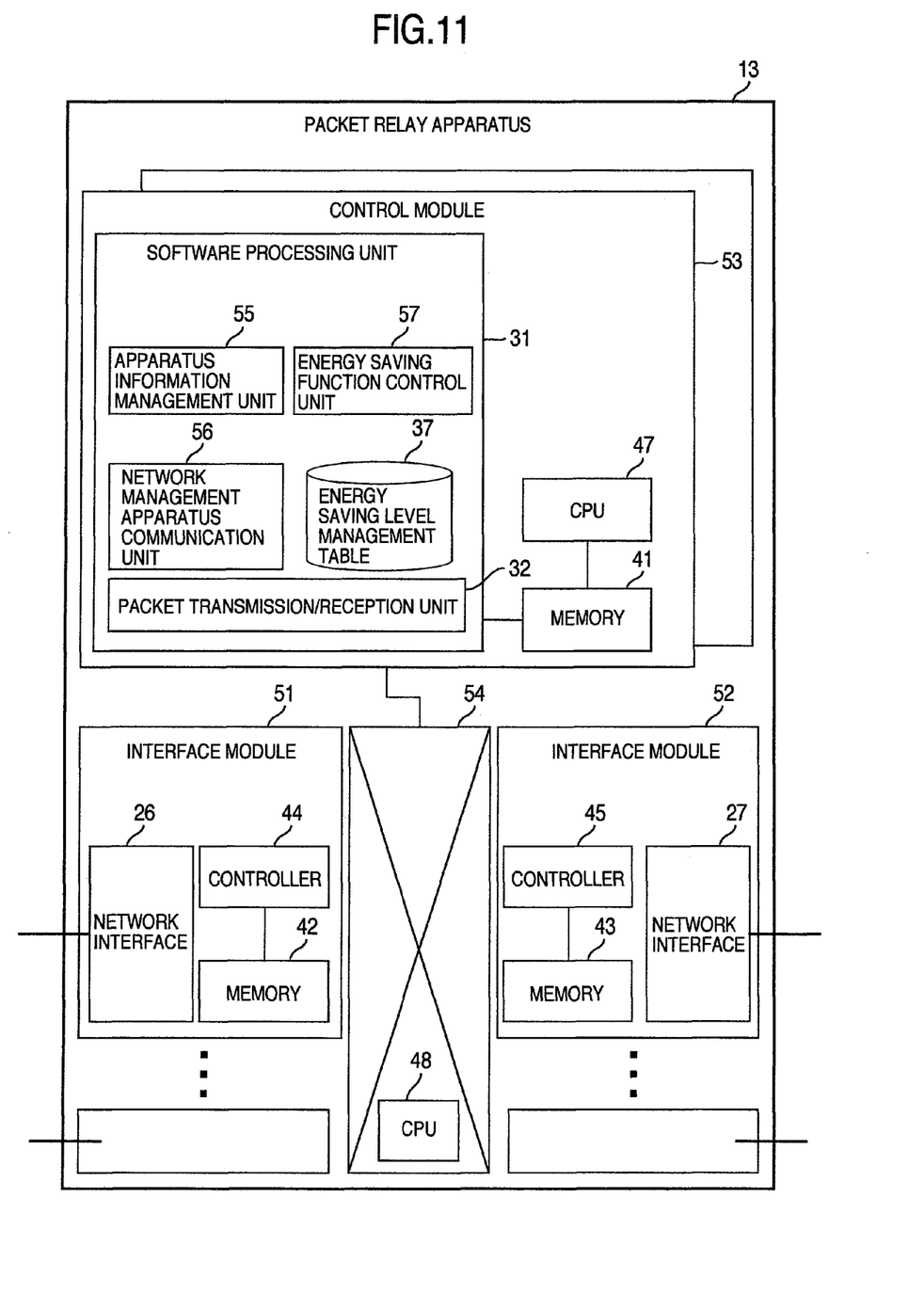
FIG. 11 is block diagram showing another example of the internal construction of the packet relay apparatus.

FIG. 11 is block diagram showing another example of the internal construction of the packet relay apparatus as the management object of the network management apparatus 11. The difference from the construction shown in FIG. 7 resides in that the software processing unit 30 keeps the energy saving level management table 37 of the apparatus model to which the packet relay apparatus belongs. The software processing unit 30 keeps the energy saving management table 101 when the packet relay apparatus 13 is the apparatus of the apparatus model A.

In this case, the network management apparatus 11 puts only the value of the energy saving level 103 to the setting request message and sends the message when setting the energy saving function to the packet relay apparatus 13. This message is sent to the energy saving function control unit 57 through the network management apparatus communication unit 56. Recognizing the value of the energy saving level so sent, the energy saving function control unit 57 looks up the energy saving level management table 101 and makes desired setting. It will be assumed hereby that the packet relay system 13 is now operated on the energy saving level "100" and the network management apparatus 11 requires the packet relay apparatus 13 to lower the energy saving level to "75". In this case, the packet relay apparatus 13 understands that the request can be satisfied by looking up the energy saving level management table 101 it holds by itself and lowering the frequency of the CPU 48 of the switching module 54 from "HIGH" to "LOW" to achieve the low speed operation. The energy saving function control unit 57 lowers the frequency of the CPU 48 of the switching module 54 and reduces the consumed electric energy.

Though the packet relay apparatus is the object apparatus managed by the network management apparatus 11 in the first to third embodiments given above by way of example, the invention is not limited to the packet relay apparatus but may be applied to other apparatuses having the energy saving function such as server apparatuses.

The invention can be realized in various forms. For example, the invention can be realized in the forms such as a network management apparatus, a server management apparatus, a control method of an energy saving function, an apparatus management system, an integrated circuit for realizing these apparatuses, methods and systems, a computer program, a recording medium recording the computer programs, and so forth.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network management apparatus connected to a plurality of packet relay apparatuses constituting a group through a network, comprising:
   an energy saving level management table for holding the combination of operation modes of a plurality of energy saving functions provided to said packet relay apparatuses and energy saving levels in association with one another;
   an apparatus information acquisition unit configured to acquire, via the network, a CPU usage ratio of said packet relay apparatuses, which belong to said group;
   an energy saving level calculation unit configured to calculate an energy saving level of said packet relay apparatuses constituting said group on the basis of said CPU usage ratio acquired by said apparatus information acquisition unit; and
   an energy saving function setting unit configured to set an energy saving function of said packet relay apparatuses on the basis of said energy saving level calculated by said energy saving level calculation unit.

2. A network management apparatus according to claim 1, wherein said apparatus information acquisition unit is configured to acquire consumed electric energy of said packet relay apparatuses in said group unit, and said energy saving level calculation unit is configured to calculate said energy saving level when the sum of the consumed electric energy of said packet relay apparatuses constituting said group exceeds allowable electric energy of said group.

3. A network management apparatus according to claim 1, wherein said energy saving level calculation unit is configured to calculate said energy saving level in such a fashion as to lower the energy saving level of said packet relay apparatus having the lowest CPU usage ratio among said packet relay apparatuses constituting said group.

4. A network management apparatus according to claim 1, wherein said energy saving function setting unit is configured to look up the operation mode of the energy saving function associated with the energy saving level calculated by said energy saving level calculation unit from said energy saving level management table and to generate a setting request for each of the energy saving functions in such a fashion as to achieve the operation looked up to said packet relay apparatus.

5. A network management apparatus according to claim 1, wherein said energy saving function setting unit is configured to notify said packet relay apparatus of the value of said energy saving level such that the operation can be made in the operation mode of the energy saving function associated with the energy saving level calculated by said energy saving level calculation unit.

6. A network management apparatus connected to a plurality of packet relay apparatuses constituting a group through a network, comprising:
   an energy saving level management table for holding the combination of operation modes of a plurality of energy saving functions provided to said packet relay apparatuses and energy saving levels in association with one another;
   an apparatus management table for managing the present energy saving level of said packet relay apparatus and an energy saving level of minimum guarantee;
   an energy saving level calculation unit configured to calculate a difference between the present energy saving level and the energy saving level of the minimum guarantee for each of said packet relay apparatuses constituting said group by looking up said apparatus management table and calculating an energy saving level of said packet relay apparatuses constituting said group on the basis of said difference; and
   an energy saving function setting unit configured to set, to said packet relay apparatus via the network, the energy saving function of said packet relay apparatuses on the basis of said energy saving level calculated by said energy saving level calculation unit.

7. A network management apparatus according to claim 6, which further comprises an apparatus information acquisition unit configured to acquire consumed electric energy of said packet relay apparatuses in said group unit, and wherein said energy saving level calculation unit is configured to calculate said energy saving level when the sum of the consumed electric energy of said packet relay apparatuses constituting said group exceeds allowable electric power.

8. A network management apparatus according to claim 6, wherein said energy saving level calculation unit is configured to calculate said energy saving level in such a fashion as to lower the energy saving level of said packet relay apparatus having the greatest difference among said packet relay apparatuses constituting said group.

9. A network management apparatus according to claim 6, wherein said energy saving function setting unit is configured to look up the operation mode of the energy saving function associated with the energy saving level calculated by said energy saving level calculation unit from said energy saving level management table and to make a setting request for each of said energy setting functions to said packet relay apparatus so that the operation is made in the operation mode so looked up.

10. A network management apparatus according to claim 6, wherein said energy saving function setting unit is configured to notify said packet relay apparatus of the value of said energy saving level such that the operation can be made in the operation mode of the energy saving function associated with the energy saving level calculated by said energy saving level calculation unit.

* * * * *